United States Patent Office 3,544,622
Patented Dec. 1, 1970

3,544,622
ALKALINE SAPONIFICATION OF POLYETHYLENE TEREPHTHALATE AT HIGH TEMPERATURES USING CONTROLLED AMOUNT OF SODIUM HYDROXIDE
Richard J. England, Circleville, Ohio, assignor to E. I. du Pont de Nemours and Company, Wilmington, Del., a corporation of Delaware
No Drawing. Continuation-in-part of application Ser. No. 438,754, Mar. 10, 1965. This application Feb. 10, 1966, Ser. No. 526,346
Int. Cl. C07c 63/28
U.S. Cl. 260—515                    12 Claims

ABSTRACT OF THE DISCLOSURE

A process for the alkaline saponification of polyethylene terephthalate in ethylene glycol to produce disodium terephthalate and subsequently, terephthalic acid, wherein the sodium hydroxide charged in the reaction mixture does not exceed 10% excess over stoichiometric based in the terephthalyl values. The process is carried out at atmospheric pressure and near the boiling point of ethylene glycol.

---

This application is a continuation-in-part of my co-pending application Ser. No. 438,754 filed Mar. 10, 1965, now abandoned.

This invention relates to the alkaline saponification of polyethylene terephthalate to produce the di(alkali metal) salt of terephthalic acid. In another aspect, this invention relates to the recovery of pure terephthalic acid from materials containing terephthalyl values.

This invention will be described herein by reference to preferred embodiments, namely, the recovery of the disodium salt of terephthalic acid and terephthalic acid itself from scrap polyethylene terephthalate.

The aqueous alkaline saponification and the anhydrous methanolysis of polyethylene terephthalate with sodium hydroxide to produce disodium terephthalate are generally known. See, for example, British patent specification No. 822,834. The present invention is an improvement in the aqueous alkaline saponification process.

According to the present invention, alkaline saponification of polyethylene terephthalate is carried out starting the reaction with a critical amount of sodium hydroxide relative to the amount of polyethylene terephthalate. Thus, according to the present invention, the alkaline saponification is carried out at atmospheric pressure and in the presence of ethylene glycol and water, wherein the amount of sodium hydroxide is at least stoichiometric based on the terephthalyl values to be recovered but is not in excess of about 10% over stoichiometric. In other words, there should be used from about 0.416 to 0.460 part by weight of sodium hydroxide per part of polyethylene terephthalate, on a dry weight basis.

Less than stoichiometric results in incomplete saponification as evidenced by flake or undissolved particles in the filter cake. The use of more than 10% over stoichiometric, it has been found according to the present invention, causes the formation of undesirable degradation products, especially high molecular weight degradation products which cause objectionable discoloration in the product.

The choice of sodium hydroxide as the alkali metal hydroxide is largely one of the convenience and economics. Other alkali metals, including potassium, lithium, rubidium and cesium, will work to some extent. However, sodium and potassium, and especially the former, are greatly preferred for the excellent results obtained.

The disodium terephthalate which precipitates from the saponification reaction can be separated from the mother liquor by any convenient means, such as by filtration, at a temperature in the range of about 20° to 198° C., and preferably about 90° to 194° C., following which, if desired, the separated disodium terephthalate can be purified by washing successively with (a) ethylene glycol at a temperature in the range from about 20° to 100° C., and preferably at room temperature; and (b) a saturated solution (preferably at least once) of disodium terephthalate in water at a temperature in the range from about 20° to 100° C., and preferably 80° to 100° C.

The saponification proceeds at temperatures of about 100° C. but preferred results, particularly with regard to product yield, are obtained when the process of this invention is carried out by heating the mass to a temperature above about 100° C. and in the range of about 100° C. to the boiling point of ethylene glycol (about 194.4° C.), and then, still at atmospheric pressure so that water present will distill off, to a temperature above about 40° C. below the boiling point of ethylene glycol and less than the boiling point of ethylene glycol, i.e., in the range of about 150° or 154° to 194.4° C., and preferably between about 170° and 194° C., for a time sufficient for substantially complete conversion of the terephthalate to disodium terephthalate, which precipitates as a solid.

The preferred starting material is waste or scrap polyethylene terephthalate which can have included its attendant impurities, coatings, fillers, modifiers, polymeric additives, etc. However, the process of this invention is applicable broadly to the treatment of material containing terephthalyl values, even as low as 1% by weight or less, from which it is desired to obtain and isolate pure terephthalic acid. Thus, the mass being treated can comprise from 1% to 100% terephthalyl values, whether it be crude terephthalic acid such as may result from commercial production of terephthalic acid or byproduct production of terephthalic acid or recovery of terephthalic acid from scrap operations, or whether it be waste or crude monomeric ethylene terephthalate, or whether it be crude, waste or scrap polyethylene terephthalate, such as is obtained in preparation of polyethylene terephthalate films, e.g., "Mylar" polyester film, or polyethylene terephthalate fibers, e.g., "Dacron" polyester fibers, with or without the other attendant materials referred to above. Usually, the starting preferred material will be more than 50% by weight, and preferably 80% to 99% by weight of terephthalyl values.

Of course, other polyalkylene terephthalates can be used in the process of this invention. Thus, for example, as will readily occur to persons skilled in this art from a knowledge of the standard and basic references, polyalkylene terephthalates where the alkylene radical is of 2 through 10 carbons can be used without departing from the scope of this invention.

The speed at which the conversion of the terephthalyl component to disodium terephthalate is effected will depend on the temperatures used and on the particle size of the starting material. At temperatures approaching the boiling point of the glycol the reaction will proceed very rapidly. At a temperature of 170° C. (for ethylene glycol), the time conversion will be approximately two times as great as at 150° C. Surprisingly, this saponification can be carried out at atmospheric pressure in a very short period of time, on the order of 15 minutes or less at about 180° C.

The amount of ethylene glycol used will preferably be in the range from about 2–14 parts by weight of ethylene glycol per part of polyethylene terephthalate per part of polyethylene terephthalate (or terephthalyl value). Below this range some difficulties in pumping may be encountered and, depending upon the impurities present, somewhat less than the optimum amount of impurities may remain undissolved. Above this range, the disadvantage is largely economic although the possibility of loss of yield of the disodium terephthalate is increased due to the solubility of the salt in the ethylene glycol. Within the highly preferred range of about 6–10 parts by weight of ethylene glycol per part of polyethylene terephthalate, faster kinetics and minimization of solubility losses are particularly achieved. An important advantage of operation within these described ranges is the resulting versatility of the process, enabling the process to be highly effective with practically any kind of waste polyethylene terephthalate, including both low and high density polymer.

It will be noted that the preferred glycol will be that which corresponds to the glycol component in the terephthalate polymer being treated. This could mean the use of such glycols as diethylene glycol, triethylene glycol, as well as higher glycols, glycerol, 1,4-cyclohexane dimethanol or the like. Thus, 1,4-cyclohexane dimethanol is the logical equivalent solvent material for terephthalyl polymers wherein 1,4-cyclohexane dimethanol is the glycol component.

The amount of water charged to the reaction will preferably be in the range of about 0.4–9.0 parts by weight per part of polyethylene terephthalate. The use of amounts above about 0.4 part has been found to effect a significant improvement in the crystal size of the disodium terephthalate product, with resultant improvement in product filterability and purifiability. Amounts above about 9.0 parts of water greatly increase the cost necessary to boil off the excess water that is present. The preferred amount of water for most other process conditions will be 2.5–3.5 parts by weight of water per part of polyethylene terephthalate.

A preferred method for carrying out alkaline saponification of polyethylene terephthalate using controlled amounts of water is described in copending application Ser. No. 526,391, filed Feb. 10, 1966.

It will be understood that the amount of water present decreases during the saponification reaction, as at atmospheric pressure the water is distilled off at the reaction temperatures. The off-steam carries with it water-soluble and water-emulsifiable impurities, e.g., kerosene, finish oils, etc., that may be present. At the completion of the reaction and distillation, the disodium terephthalate solid product is essentially anhydrous and ready for filtration, washing, etc.

Within the above proportions, the starting ratio of ethylene glycol to water, on a weight basis, will not be less than about 1.5 to 1, and will preferably be about 2 to 1. Of course, as the reaction proceeds and water is distilled off, the ratio increases to as high as 50 or 100 to 1 or higher.

If foaming to an objectionable extent occurs during the saponification reaction, a small amount, e.g., about 0.1–5 parts by weight, of a compatible anti-foaming agent can be used, such as Rohm & Haas' Triton X-100. Foaming can be minimized also, and reaction kinetics favored, by carrying out the reaction with stirring or other agitation.

As a safety warning, it will readily occur to persons in this art that the use of an inert gas blanket, such as nitrogen, will for most conditions of the process be desirable.

The order of addition or admixture of the reactants above, as well as the temperature of any reactant at time of admixture, is not critical, as long as eventually heating takes place for the essential conversion. Thus, separate streams, any or all hot or cold, can be used to bring the reactants together, followed by heating as described to complete the reaction.

After the conversion of the terephthalyl component to disodium terephthalate is complete, the disodium terephthalate is separated from the causticized glycol mixture. Although filtration is mentioned above as the preferred separation method, other known techniques can of course be used as decantation, centrifugation, etc. One or more hold tanks can be used to enhance a continuous process or semicontinuous process. Suitable types of filters include plate filters, rotary filters, vertical leaf filters, etc. Filtration will preferably be hot, such as 150–194° C. and preferably at the end temperature of the saponification reaction.

An important advantage of the process of this invention lies in the fact that the filtrate from the just-described filtering operation can be recycled back into the saponification. The only factors involved are those recited above regarding preferred and optimum concentrations of components charged to the saponification reaction.

As stated above, the disodium terephthalate is if desired then successively washed one or more times with (1) ethylene glycol at a temperature of 20 to 100° C. and (2) a saturated (about 15% by weight) aqueous solution of disodium terephthalate in water, preferably near boiling. The wash step with the saturated solution of disodium terephthalate water is advantageous to remove remaining glycol in the disodium terephthalate filter cake along with glycol-soluble impurities. Other means can be employed for removal of glycol from the cake, e.g., washing with various glycol-soluble solvents, heated air or inert gas, but saturated disodium terephthalate is preferred because of its better compatibility with the process and its low cost.

The product disodium terephthlate recovered as described above can be used as such, or converted to useful corresponding esters, such as dimethyl terephthalate.

In a preferred aspect related to this invention, the disodium terephthalate is converted by acidification to terephthalic acid.

In this aspect, the disodium terephthalate, conveniently as the filter cake from the above steps, is dissolved in water at 20° to 100° C., and the solution filtered.

After this, if terephthalic acid of very high purity is required, the disodium terephthalate can if desired be subjected to an activated carbon treatment wherein from about 0.5% to about 10%, and preferably 0.5% to 5%, by weight of activated carbon is admixed with the solution at a temperature of about 90° to 95°C. and agitated for about 5 to 45 minutes. The carboi is then removed by filtration or other conventional technique. In one convenient arrangement, the aqueous solution can be carbon treated by passing the solution through a charcoal column.

The disodium terephthalate solution is then neutralized to terephthalic acid with an approximately stoichiometric amount of a strong acid, preferably an aqueous solution of 10% to 100% by weight of a mineral acid such as sulfuric acid or hydrochloric acid. The reaction slurry is allowed to remain at a temperature of, say, about 90° to 95° C. for 10 to 15 minutes, more or less, up to an hour or more, and then filtered. The filter cake (terephthalic acid) is then washed if desired with successive portions of water to remove occluded soluble salts. The terephthalic acid is then dried, e.g., and 125° C. for 3 hours is easily sufficient.

The invention will be more readily understood by reference to the following examples which are given for purposes of illustration only and not by way of limitation and in which parts and percentages are by weight unless otherwise indicated.

EXAMPLE 1

The alkaline saponification of scrap polyethylene terephthalate as carried out using waste edge-trim scrap from the commercial production of "Mylar" polyethylene terephthalate film. The scrap contained its usual components other than polyethylene terephthalate polymer, such as catalyst, degradation products which are objectionable color-forming agents, etc. The edge film sample of scrap was ⅞ inch square and had an average thickness of about 25 mils.

The following ingredients were charged to a reaction vessel:

| | Grams |
|---|---|
| Polyethylene terephthalate scrap chips | 110 |
| Distilled water | 387 |
| 50% aqueous sodium hydroxide | 97 |
| Ethylene glycol | 880 |
| Antifoaming agent (Rohm & Haas' Triton X–100 | 1.1 |

The amount of sodium hydroxide was 5.9% excess over stoichiometric. The charge was heated under a nitrogen blanket while collecting distillate to permit the measurement of the volume of off-water. At about 116° C. the first condensation of the distillate was observed. Heating was continued, taking 80 minutes for the mass temperature to reach 125° C. and 62 additional minutes for a total of 142 minutes to reach 170° C. When the mass reached 170° C. it was allowed to sit at room temperature for 15 minutes, cooling to about 160°–165° C. The mass was then vacuum filtered hot and the filter cake sucked as dry as possible by applying maximum vacuum for 10 minutes. The crystals of disodium terephthalate were readily filterable. The crystals were then dissolved in sufficient water to make a saturated solution which was then filtered to obtain a filter cake, primarily unreacted polyethylene terephthalate, which after drying weighed 5.1 grams. The conversion to disodium terephthalate was 95.2%.

As a test of purity, a one centimeter cell of the saturated solution of disodium terephthalate was examined for light transmission at 400 millimicrons in a Beckman DU Spectrophotometer, comparing it with a cell of distilled water as a blank. The product of Example 1 had an optical density of 0.02, indicating an extremely pure product.

A second experiment was run for comparison purposes which was identical to that just described in Example 1 except that 184 grams of 50% aqueous sodium hydroxide was used (an excess of 100% over stoichiometric). The final filter cake after drying weighed 0.3 grams and the conversion to disodium terephthalate was 99.5%. In the purity test the product had an optical density of 0.129, indicating degradation and a sharp color increase compared with the product of Example 1. The saturated solution was observed to have a very noticeable orange-yellowish discoloration whereas that of Example 1 had a barely perceptible pale yellow tint.

EXAMPLE 2

Waste polyethylene terephthalate (110 grams) in particulate form is introduced into a reactor. Into the same reactor is added 93 grams of 50% aqueous sodium hydroxide (stoichiometric amount based upon the weight of the terephthalyl content of the waste material) and 800 grams of ethylene glycol. (This can conveniently be ethylene glycol recovered from the polymerization process used in the preparation of the original polyethylene terephthalate). The reaction mixture is heated to 170° C. and agitated while collecting distillate (mostly water with some carried-over ethylene glycol). The slurry which results of disodium terephthalate in the ethylene glycol is filtered while at a temperature of 170° C. in a vacuum filter. The disodium terephthalate filter cake is pressed as dry as possible and the filtrate (ethylene glycol) removed for recovery. The filter cake is then washed first with room temperature ethylene glycol to remove additional impurities and to cool the cake to less than 100° C. followed by washing with a saturated solution of disodium terephthalate in water (maintained at 90° to 100° C.). The filtrates from these washes are combined and returned to the reactor to serve as the nucleus for future soponification reactions. The disodium terelphthalate is then washed again with a saturated disodium terephthalate solution in water at 90° to 100° C. This filtrate is stored to become the first wash for the filter cake in future reactions.

The disodium terephthalate is now dissolved in sufficient water to effect complete dissolution (15 grams of disodium terephthalate is soluble in 100 milliliters of cold water). The solution is transferred to a filter tank and filtered to remove any insoluble impurities, e.g., pigments, polyethylene, vinylidene chloride type degradation products, etc. The solution is then neutralized with 100% sulfuric acid (stoichiometric amount). The resulting slurry is heated at 90° to 95° C. for 15 minutes and filtered in a filtertank. The filter cake is then washed with seven 300-milliliter portions of distilled water to remove the inorganic sulfates formed during the neutralization. The terephthalic acid is then dried in a dryer for three hours at a temperature of about 125° C.

In a preferred modification of the embodiment of this Example just described, immediately prior to the neutralization with sulfuric acid the solution is heated to about 90° C. and 3% (based on the total weight of terephthalyl content) of pulverized activated carbon (e.g., Pittsburgh Coke and Carbon Co., Type BL) is added while the solution is being agitated. Agitation is continued for 15 minutes at 90° to 95° C. The carbon is filtered off using a suitable filter. The color (indicative of purity), as measured by comparing the percent light transmission, (½ inch path) at 350 millimicrons using a spectrophotometer, of distilled water with samples of the solution before and after treatment, improves materially (50% transmission before, 97% after, in a specific exemplary experiment).

The purified terephthalic acid is then recycled back into the polyethylene terephthalate polymerization process, being added directly to the monomeric ethylene terephthalate (formed from the ester interchange reaction between dimethyl terephthalate and ethylene glycol) prior to substantial polymerization having taken place, in amounts up to 20% by weight based on the weight of dimethyl terephthalate. The polymer thus made is of excellent color and has properties equivalent to control polymer, as shown by a plurality of tests.

EXAMPLE 3

Following the procedure of Example 2, 130 grams of crude terephthalic acid (percent transmission of saturated disodium terephthalate as measured at 350 millimicrons equals zero), 580 grams of ethylene glycol, 136 grams of 50% aqueous sodium hydroxide (10% excess over stoichiometric) and 854 grams of recycle material (room-temperature recovered ethylene glycol wash and first disodium filter cake wash from Example 2) are reacted while being agitated and heated to a temperature of about 170° C. Distillate (240 milliliters) is collected during this period. The reaction slurry is filtered while still hot (165° to 170° C.). The filter cake is pressed dry and then washed with 400 grams of room-temperature ethylene glycol. Following the glycol wash, the filter cake is washed with an aqueous saturated disodium terephthalate solution which had been utilized in the second filter cake wash in Example 2. The disodium terephthalate filter cake is washed a second time with 400 grams of saturated disodium terephthalate solution from the final purified disodium terephthalate solution from Example 2. The filtrate is retained for first disodium terephthalate filter cake wash for the next batch. The disodium terephthalate is then dissolved in water to form a nearly saturated solution of disodium terephthalate and a portion is retained for the second disodium terephthalate cake for the batch.

The remainder is neutralized with 50 milliliters of 100% sulfuric acid and the slurry cooked for 15 minutes at 90° to 95° C. and filtered. The filter cake is washed with seven 300-milliliter portions of boiling distilled water. The terephthalate acid is then dried at about 125° C. for three hours. The product is white and has a percent transmission at 350 millimicrons of 52%. Fifteen mol percent of this product when added to the polyethylene terephthalate process as in Example 2 gives a polymer of excellent color and has other properties (viscosity, carboxyl end groups, and ether content level) which are essentially equivalent to control polymer.

In a control experiment for comparison with Example 3, a sample of the crude terephthalic acid used as the starting material of that example is dissolved in aqueous sodium hydroxide to form a stoichiometrically neutralized saturated solution of disodium terephthalate and treated with 5% (based on the weight of terephthalic acid) of the same activated carbon as in that example. All the steps are the same as those described in Examples 2 and 3 with the exception that the glycol addition (step (3)(a)) is omitted. The percent transmission at 350 millimicrons of the carbon treated solution is only 0.5%. Fifteen mol percent of this product is added to the polyethylene terephthalate polymerization process as in Example 2 and gives a polymer of unsatisfactory color.

The process of the present invention not only provides a rapid and complete degradation reaction with waste polyethylene terephthalate to produce terephthalic acid, but the purity of the terephthalic acid obtained in exceedingly high, being at least equivalent in purity to the dimethyl terephthalate new being employed in the preparation of polyethylene terephthalate.

The invention claimed is:

1. In the process of aqueous sodium hydroxide saponification of polyethylene terephthalate in ethylene glycol to obtain disodium terephthalate, the improvement comprising: heating the reaction mass at atmospheric pressure to a temperature above about 100° C. and in the range of about 100° C. to the boiling point of ethylene glycol, and then, still at atmospheric pressure so that the water present can boil off, heating the reaction mass to a temperature above about 150° C. and in the range up to the boiling point of ethylene glycol, and maintaining that temperature for about one hour or less, whereby solid disodium terephthalate precipitates, and separating the precipitated disodium terephthalate.

2. The process of claim 1 wherein said separating is by filtration at a temperature in the range of 90°–194° C.

3. The process of claim 1 wherein the separated disodium terephthalate is washed successively with ethylene glycol and a saturated aqueous solution of disodium terephthalate.

4. The process of claim 1 wherein from about 2–14 parts by weight of ethylene glycol per part of polyethylene terephthalate is charged to the reaction.

5. The process of claim 1 wherein the separated disodium terephthalate is subsequently treated with 0.2–10% by weight of activated carbon.

6. The process of claim 5 wherein the treated disodium terephthalate is subsequently acidified with sulfuric acid to produce terephthalic acid and said terephthalic acid is then recovered and dried.

7. In the process of aqueous sodium hydroxide saponification of polyethylene terephthalate in ethylene glycol to obtain disodium terephthalate, wherein the reaction is held at a temperature in the range of from about 150° C. to 194.4° C. for about one hour or less, the improvement comprising charging to the reaction an amount of sodium hydroxide from stoichiometric up to about 10% excess over stoichiometric based on the terephthalyl values charged to the reaction, heating the reaction mass whereby solid disodium terephthalate precipitates, and separating the precipitated disodium terephthalate.

8. The process of claim 7 wherein said separating is by filtration at a temperature in the range of 90°–194° C.

9. The process of claim 7 wherein the separated disodium terephthalate is washed successively with ethylene glycol and a saturated aqueous solution of disodium terephthalate.

10. The process of claim 7 wherein from about 2–14 parts by weight of ethylene glycol per part of polyethylene terephthalate is charged to the reaction.

11. The process of claim 7 wherein the separated disodium terephthalate is subsequently treated with 0.2–10% by weight of activated carbon.

12. The process of claim 10 wherein the treated disodium terephthalate is subsequently acidified with sulfuric acid to produce terephthalic acid and said terephthalic acid is then recovered and dried.

References Cited
UNITED STATES PATENTS 3,120,561   2/1964   Chambret _____ 260—515

FOREIGN PATENTS 822,834   11/1959   Great Britain.

LORRAINE A. WEINBERGER, Primary Examiner

E. J. GLEIMAN, Assistant Examiner

PO-1050
(5/69)

UNITED STATES PATENT OFFICE
CERTIFICATE OF CORRECTION

Patent No. 3,544,622      Dated December 1, 1970

Inventor(s)      Richard J. England

It is certified that error appears in the above-identified patent and that said Letters Patent are hereby corrected as shown below:

Column 4, line 44, "carboi" should read --carbon--; Column 4, line 67, "as" should read --was--; Column 5, line 8 "(Rohm & Haas' Triton X-100" should read --(Rohm & Haas' Triton X-100)--; Column 5, lines 69-70, "soponification" should read --saponification--; Column 7, line 23, "new" should read --now--; Column 8, line 31, "claim 10" should read --claim 11--.

Signed and sealed this 8th day of June 1971.

(SEAL)
Attest:

EDWARD M. FLETCHER, JR.      WILLIAM E. SCHUYLER, JR
Attesting Officer      Commissioner of Patents